Sept. 17, 1946.                C. JACKSON                2,407,883
                    PERMANENT MAGNET FIELD GENERATOR
                         Filed Feb. 21, 1944
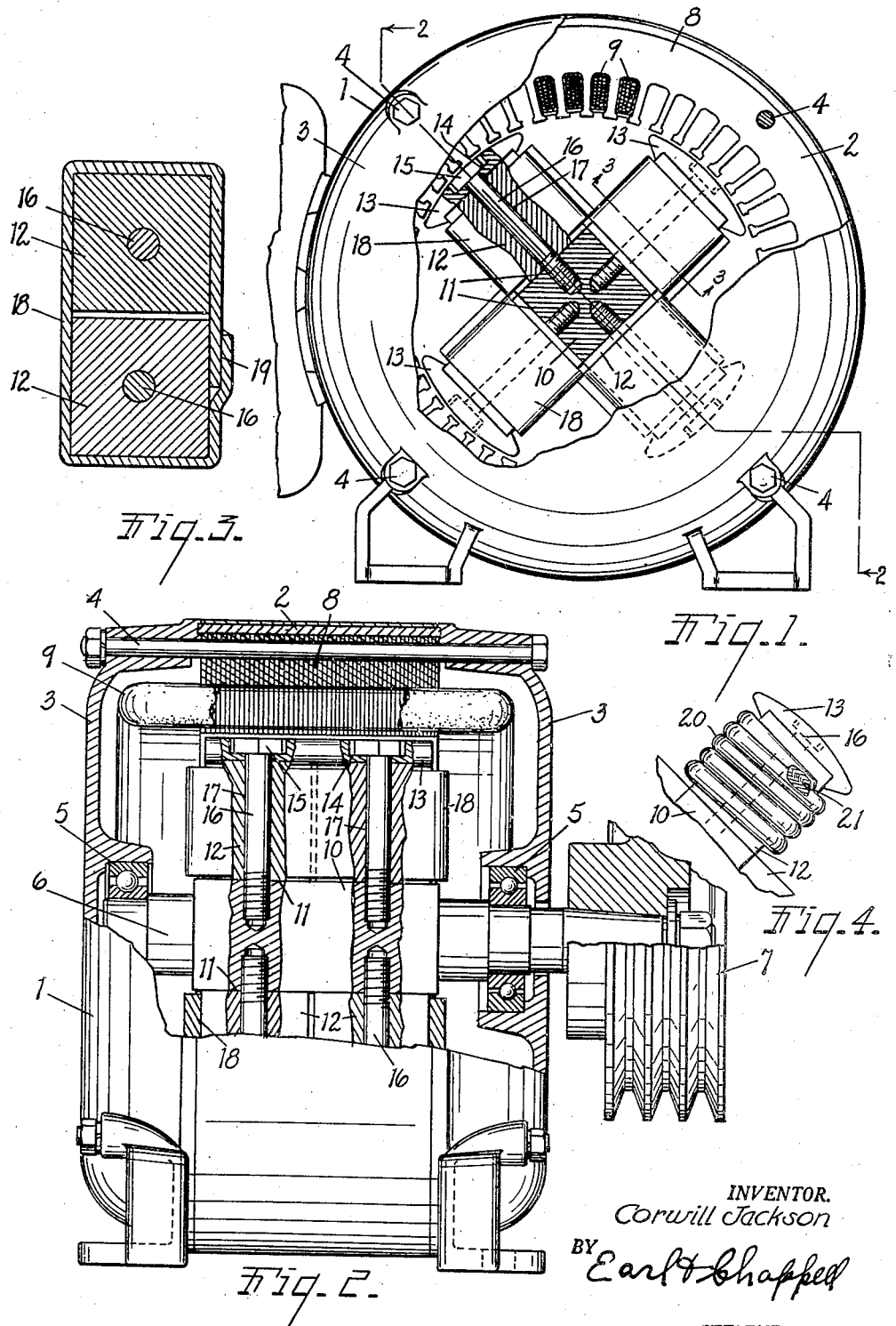
INVENTOR.
Corwill Jackson
BY Earl T. Chappell
ATTORNEYS.

Patented Sept. 17, 1946

2,407,883

UNITED STATES PATENT OFFICE 2,407,883

PERMANENT MAGNET FIELD GENERATOR

Corwill Jackson, Ludington, Mich.

Application February 21, 1944, Serial No. 523,222

5 Claims. (Cl. 171—209)

This invention relates to improvements in permanent magnet field generators.

The main objects of this invention are:

First, to provide a generator which is highly efficient or of large capacity in proportion to the size and the weight of materials entering therein.

Second, to provide a generator which is of simple and compact design and of low cost and one which greatly reduces the amount of copper and copper base materials as compared to widely used types of generators.

Third, to provide a generator of greatly simplified construction, commutators and coacting parts being unnecessary.

Fourth, to provide a self-exciting generator of relatively large capacity and without spark radiation or radio interference.

Objects relating to details and economies of the invention will appear from the description to follow. The invention is defined and pointed out in the claims.

A preferred embodiment of the invention is illustrated in the accompanying drawing, in which:

Fig. 1 is a fragmentary end elevation of a generator embodying the features of my invention in a practical commercial form.

Fig. 2 is a fragmentary view partially in section on line 2—2 of Fig. 1.

Fig. 3 is an enlarged section on line 3—3 of Fig. 1.

Fig. 4 is a fragmentary view illustrating a modified form or embodiment of my invention.

In the embodiment of my invention illustrated, the casing or housing designated generally by the numeral 1 comprises the central portion 2 and end or cap portions 3, these parts being secured in assembled relation by means of the bolts 4. The end members 3 carry the bearings 5 for the rotor shaft 6. The pulley 7 is of the multiple belt type. I have not illustrated the wiring.

The stator 8 is of the laminated armature type, the windings 9 being conventionally illustrated. This stator is slipped within the central shell portion 2 of the housing and is secured therein by the end members 3 and the bolts 4.

The shaft 6 is preferably provided with a square or rectangular portion 10 intermediate its bearings, the flat surfaces 11 of which provide seats for the permanent magnet pole pieces 12. These permanent magnet pole pieces 12 are, in the embodiment illustrated, arranged in pairs. The permanent magnet pole pieces 12 are preferably of block-like form of rectangular section. While in the embodiment illustrated they are arranged in pairs and four pairs are illustrated, it will be understood that the number may be varied.

The pole pieces are arranged in angularly spaced relation and are provided with pole piece shoes 13 common to the sets or pairs of pole pieces where a plurality of pole pieces are provided constituting a set. These pole piece shoes are recessed on their inner sides to receive the ends of the permanent magnet pole pieces and are provided with countersunk openings 14 to receive the heads 15 of the cap screws 16 which are arranged through the bore 17 in the permanent magnet pole pieces and threaded into the shaft. This provides a simple and effective mounting for the pole piece shoes and the permanent magnet pole pieces so that the rotor constitutes an assembled unit.

The permanent magnet pole pieces are surrounded and closely embraced by closed circuit coils of low resistance, suitably a single coil in the form of a band of copper illustrated in the embodiments of Figs. 1, 2 and 3, the ends of the band being overlapped and brazed together at 19. However, this closed circuit coil may be formed of a plurality of wraps of wire, as shown at 20 in Fig. 4, the ends of the wire being brazed to the adjacent wrap as indicated at 21. In both cases, the closed circuit coil is within the field of the permanent magnet pole pieces and in non-insulated relation thereto, preferably being in direct supported engagement with the pole pieces.

The permanent magnet pole pieces are of the type having a high degree of permanency. However, the closed circuit coils embracing the permanent magnets appear to perform a very important function in preventing or minimizing de-magnetizing of the permanent magnets.

It is the applicant's theory that the induced alternating current set up in the stator windings by the fixed flux or magnetic lines of force passing through the windings as the machine revolves sets up de-magnetizing currents which tend to weaken or de-magnetize the permanent magnet fields. The closed circuit coils neutralize or greatly lessen this de-magnetizing effect and prevent gradual deterioration or weakening of the magnetic fields over long periods of time. In any event, the arrangement of the parts produces highly satisfactory results.

It will be noted that in my invention illustrated, no commutator device, collector rings, or the like are required. While I have illustrated the permanent magnet pole pieces in pairs, single pole pieces may be used or more than two may be used in a set. For example, the applicant has found it practical to use in a 1.5 kw. generator one permanent magnet encircled by a single closed circuit coil; in 2–5 kw. generators two are used while in 5 kw. generators sets of four magnets are employed, each pair of the set of four being provided with a surrounding closed circuit coil. Single phase, three-phase currents may be taken off merely by changing the stator connection. As previously stated, I have not illustrated the wiring as this will be understood in the art.

Generators embodying my invention may be made very compactly and light in weight for any given output and at low cost. In addition to the elimination of the cost of commutators, collector rings, and the like, there is the item of elimination of commutation maintenance. The fact that there is no radio interference or radiation together with its light weight renders the generator particularly desirable for many uses where portable generators or portably mounted generators are desirable. The reduction in the use of copper and copper base materials is also an important factor, and likewise the reduction of wire and steel, all so-called critical materials. The closed circuit coil 18 may suitably be formed of a sheet or strip of copper and no insulation is required on the rotor.

The closed circuit band or coil 20 is also of little cost and simple to apply.

I have illustrated and described a single practical embodiment of my invention. While my invention is capable of a wide application or adaptation, it is believed that this disclosure will enable those skilled in the art to embody or adapt my invention as may be desired.

Having thus described my invention, what I claim as new and desire to secure by Letters Patent, is:

1. In a generator, the combination of a wound armature stator, a rotor rotatable within said stator and comprising a shaft having a portion of rectangular section intermediate its bearings, a plurality of pairs of block-like permanent magnet pole pieces mounted on the flat sides of said shaft in radially disposed relation, pole piece shoes detachably connected to said permanent magnet pole pieces and having recessed inner sides receiving the ends of said permanent magnet pole pieces, each permanent magnet pole piece being disposed with one magnetic pole abutting said shaft and with the opposite magnetic pole abutting a pole piece shoe, said pole piece shoes being of a length corresponding substantially to the width of the armature, radially disposed cap screws, each cap screw arranged through one of said pole piece shoes and radially through both the north and south magnetic poles of one of said permanent magnet pole pieces and threaded into said shaft whereby the permanent magnet pole pieces and pole piece shoes are detachably secured together and to the shaft, and copper bands of low resistance surrounding the permanent magnet pole pieces in closely embracing direct contact therewith, the ends of the copper bands being overlapped and brazed together, the width of the bands approximating the radial length of the permanent magnet pole pieces and extending approximately from said shaft to the pole piece shoes.

2. In a generator, the combination of an annular armature stator, and a rotor rotatable within said stator and comprising a shaft, pairs of block-like permanent magnet pole pieces disposed on said shaft in radial and angularly disposed relation, pole piece shoes detachably mounted on the ends of said pairs of permanent magnet pole pieces, each permanent magnet pole piece being disposed with one magnetic pole abutting said shaft and with the opposite magnetic pole abutting a pole piece shoe, radially disposed cap screws, each cap screw arranged through one of said pole piece shoes and radially through both the north and south magnetic poles of one of said permanent magnet pole pieces and threaded into said shaft whereby said permanent magnet pole pieces and said pole piece shoes are detachably secured together and to said shaft, and low resistance closed circuit bands of copper surrounding and in closely embracing direct contact with the radially extending surfaces of the permanent magnet pole pieces.

3. In a generator, the combination of an annular armature stator, and a rotor rotatable within said stator and comprising a shaft, sets of block-like permanent magnet pole pieces disposed on said shaft in radial and angularly disposed relation, pole piece shoes on the ends of said sets of permanent magnet pole pieces, each permanent magnet pole piece being disposed with one magnetic pole abutting said shaft and with the opposite magnetic pole abutting a pole piece shoe, means for detachably securing said pole pieces and said pole shoes to each other and to said shaft, said means including members having heads engaging the outer surfaces of said sole piece shoes, said members extending from said heads radially through said sole piece shoes and pole pieces into said shaft, and low resistance closed circuit conductors surrounding said permanent magnet pole pieces, said conductors closely embracing said permanent magnet pole pieces for substantially the entire radial length thereof between said shaft and said pole piece shoes.

4. In a generator, the combination of a wound armature stator, and a rotor rotatable within said stator and comprising a shaft, sets of block-like permanent magnet pole pieces disposed on said shaft in radial and angularly disposed relation, pole piece shoes detachably mounted on the ends of said sets of permanent magnet pole pieces, each permanent magnet pole piece being disposed with one magnetic pole abutting said shaft and with the opposite magnetic pole abutting a pole piece shoe, radially disposed cap screws, each cap screw arranged through one of said pole piece shoes and radially through both the north and south magnetic poles of one of said permanent magnet pole pieces and threaded into said shaft whereby said permanent magnet pole pieces and said pole piece shoes are detachably secured together and to said shaft, and low resistance closed circuit coils embracing the radially extending surfaces of the permanent magnet pole pieces.

5. In a generator, the combination of an annular armature stator, a rotor rotatable within said stator and comprising a rotary shaft, a plurality of sets of block-like permanent magnets disposed radially around said shaft, the permanent magnets of a set being disposed in alignment longitudinally of said shaft, each of the permanent magnets of a set being relatively small and separately formed, a pole piece shoe connecting the outer ends of the permanent magnets of a set, each of the permanent magnets of a set having one magnetic pole abutting said shaft and the opposite magnetic pole abutting said pole piece shoe, and means for detachably securing the permanent magnets and the pole piece shoes to each other and to said shaft, said means including members having heads engaging the outer surfaces of said shoes, said members extending from said heads radially through said pole piece shoes and permanent magnets into said shaft.

CORWILL JACKSON.